No. 809,641. PATENTED JAN. 9, 1906.
J. A. SWINEHART.
VEHICLE TIRE.
APPLICATION FILED APR. 2, 1904.

2 SHEETS—SHEET 1.

WITNESSES:

INVENTOR.
James A. Swinehart
BY H. J. Fisher
ATTORNEY.

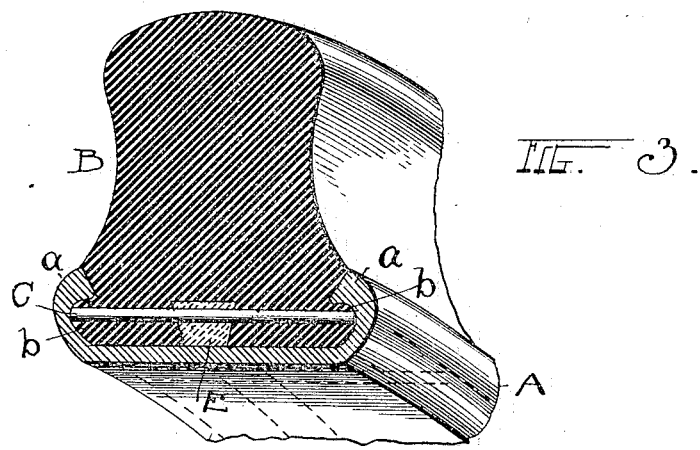
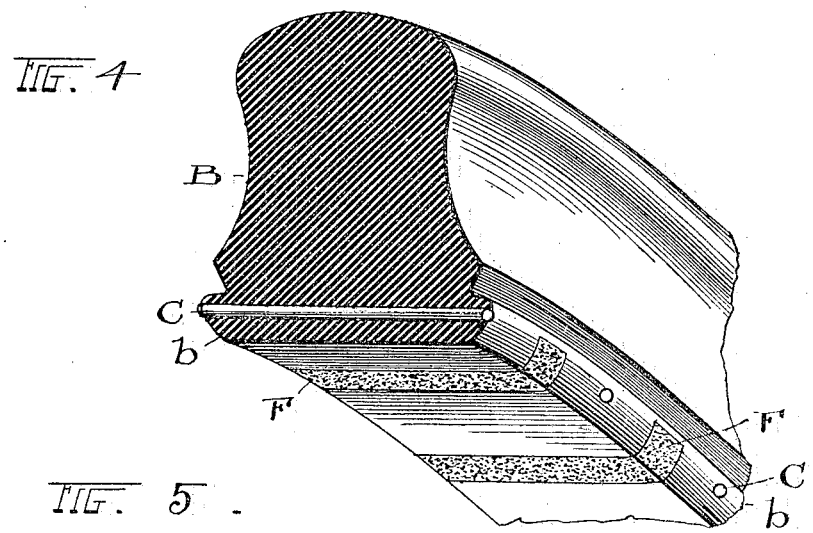
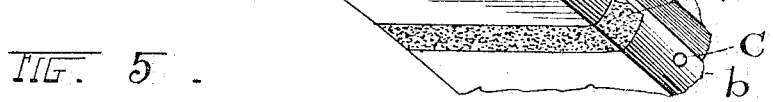
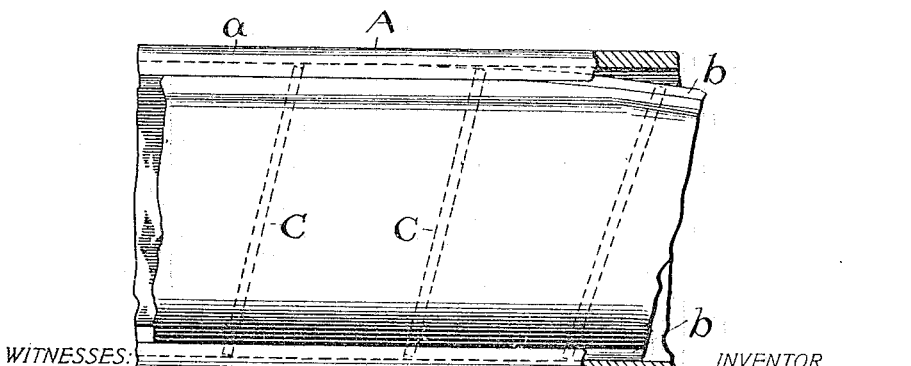

UNITED STATES PATENT OFFICE.

JAMES A. SWINEHART, OF AKRON, OHIO.

VEHICLE-TIRE.

No. 809,641.　　　　Specification of Letters Patent.　　　　Patented Jan. 9, 1906.

Application filed April 2, 1904. Serial No. 201,248.

*To all whom it may concern:*

Be it known that I, JAMES A. SWINEHART, a citizen of the United States, residing at Akron, in the county of Summit and State of Ohio, have invented certain new and useful Improvements in Vehicle-Tires; and I do declare that the following is a full, clear, and exact description of the invention, which will enable others skilled in the art to which it appertains to make and use the same.

My invention relates to vehicle-tires of the kind adapted more particularly to heavy vehicles—such as automobiles, traction-vehicles of different kinds, and such as require exceptionally strong engagement of the rubber tire upon the wheel.

Figure 1:
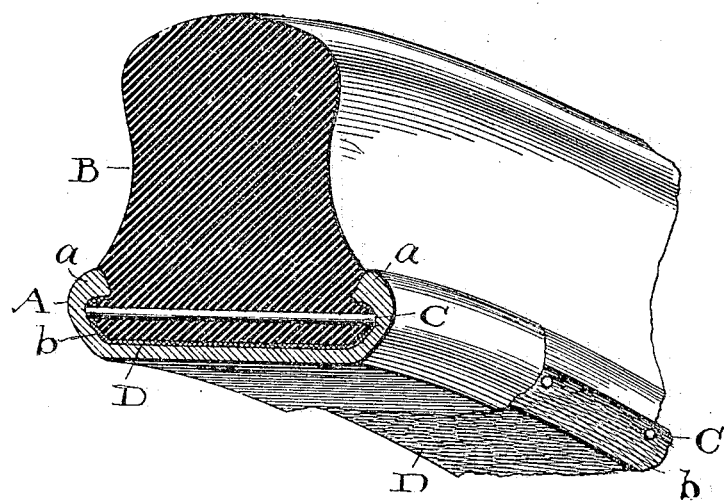
Figure 2:
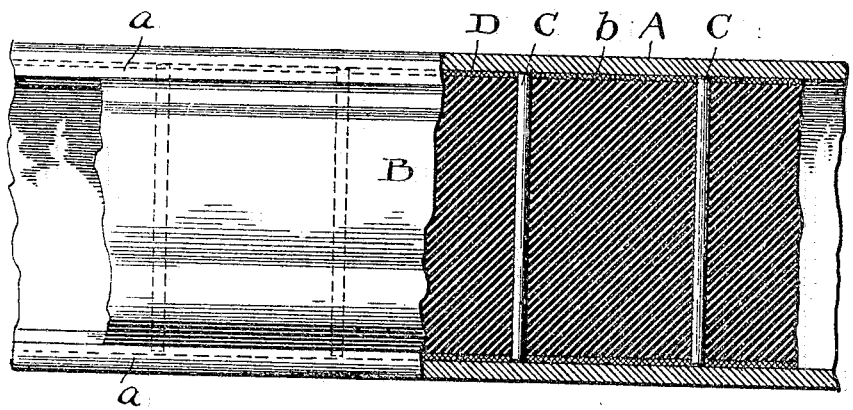

Figure 1 is a perspective view of a section of a tire embodying my invention in one of its several forms; and Fig. 2 is a bottom view of Fig. 1 with a portion of the rim of the tire broken away to disclose the cross-wires in the base of the tire, as will hereinafter more fully appear. Fig. 3 is a perspective view of a section of a tire, showing a modification of Fig. 1 and having a cement filling centrally between its sides; and Fig. 4 is a perspective view of another modification of the invention, showing a section of the tire without the rim and with transverse cement filling in its base. Fig. 5 is a plan view of a section of the tire, showing diagonally-disposed cross-wires for securing the tire upon the rim.

In each and all of the several illustrations of the invention thus described I employ what is known as a "clencher-channel" rim A, having inturned side and outer edges *a* and a solid-rubber tire B, with a relatively widened base terminating on both sides in ribs, beads, or flanges *b*, running continuously and engaged beneath the edges or flanges *a*. Cross wires or rods C extend through the base of the rubber tire at suitable intervals and are engaged at their ends within or beneath the inwardly-overhanging flanges *a* of the said rim, thus effectually holding the tire on the rim. In some instances I arrange these wires or rods C directly across the tire at right angles to its sides and make them of such length and strength that it is impossible to draw them out from beneath flanges *a* by strain or otherwise in service upon the road; but in other instances I arrange the said wires diagonally or at more or less angle to the sides of the tire or direction of travel—say about as seen in Fig. 5. This arrangement of the wires has both advantage and disadvantage. Its advantage lies in the facility it affords for placing the rubber tire upon the wheel, because it is possible with wires thus disposed to give such a twist or turn to the tire as will enable one end of the wire to be carried forward far enough to engage it beneath flange *a* at that side when the opposite end of the wire has been previously engaged under the flange at the other side. Then as the wire is thus brought beneath the flange at both ends the rubber tire resumes its proper relation to the rim and the wire is in working position. The same action can be repeated from wire to wire, and a rubber tire carrying wires of this kind can in this way be placed upon a wheel and will render very excellent service; but such an engagement has the disadvantage of possibly being thrown out when strain becomes severe and a side twist or roll is given to the tire, as may occur when a vehicle is running in a car-track and is trying to get out or when it strikes an obstacle in the road which deflects the tire. Otherwise I regard this as a satisfactory construction.

Referring now again to Figs. 1 and 2, it will be observed that tire B is provided with a canvas or non-stretchable fabric D, which is cemented to or upon the base of the tire and about the side portions or ribs thereof and is also cemented in the clencher channel or rim A, so as to effectually engage the tire with the rim and prevent creeping as well as stretching of the rubber.

The same general features are present in Fig. 3, except that in this construction the canvas or other fabric is omitted and the base of the tire B is provided with a dovetailed continuous channel centrally between its sides, which extends entirely around the wheel and is filled with a suitable cement filling E, through which the wires or rods C are passed. This filling hardens and likewise overcomes the objection of the creeping of the tire and the stretching of the rubber and affords a very firm support for the cross-wires, as is obvious. It also serves as a wedge laterally for confining the base *b* of the tire within the flanges A.

In the modification Fig. 4 the tire B is provided with cross-wires C at intervals, as in the other forms of the invention above described, and midway between these wires transversely in the base of the tire are laid cement fillings F. These may correspond in quality and material to the filler E in Fig. 3, and any suitable, durable, and solid filler may be used for this purpose, it being of course understood that it is of a character which will work with the rubber and aid in holding the rubber within the rim or channel A. This also prevents the creeping of the tire upon the rim. The filling referred to is preferably a gutta-percha cement; but it may be a fusible cement, and hence I do not limit myself in this particular. It may fuse with the rubber or be specially adhered thereto.

Without suitable means to prevent creeping of the tire upon the rim the wires become worn and useless at the point of engagement with the sides of the rim. Thus a canvas reinforcement or a hard filler or adhering medium, such as cement, is essential to bind the tire upon the rim against side and end movement and to prevent twisting of the tire at its base from its seat and to secure the flange and wires in their engagement with the inturned sides of the rim.

What I claim is—

1. In vehicle-tires, a metallic rim having opposite incurved edges about its periphery, in combination with a solid continuous rubber tire in said rim provided with side ribs engaged beneath said edges, a binding material interposed between said rim and tire and cemented to both, and cross-wires extending transversely through said tire and binding material and engaged at their ends beneath said incurved edges, substantially as described.

2. In a vehicle-tire, the combination of a metallic rim having inturned side edges with an elastic tire having side projections adapted to fit within said rim, and provided with metallic bars embedded diagonally of the tread and within said tire and adapted to engage and lock beneath said rim edges, and a binding material fastened to both said rim and tire adapted to fix and hold said bars in their locking position, substantially as described.

In testimony whereof I sign this specification in the presence of two witnesses.

JAMES A. SWINEHART.

Witnesses:
R. B. MOSER,
C. A. SELL.